INVENTOR.
T. R. HALL
BY
Robb+Robb
attorneys

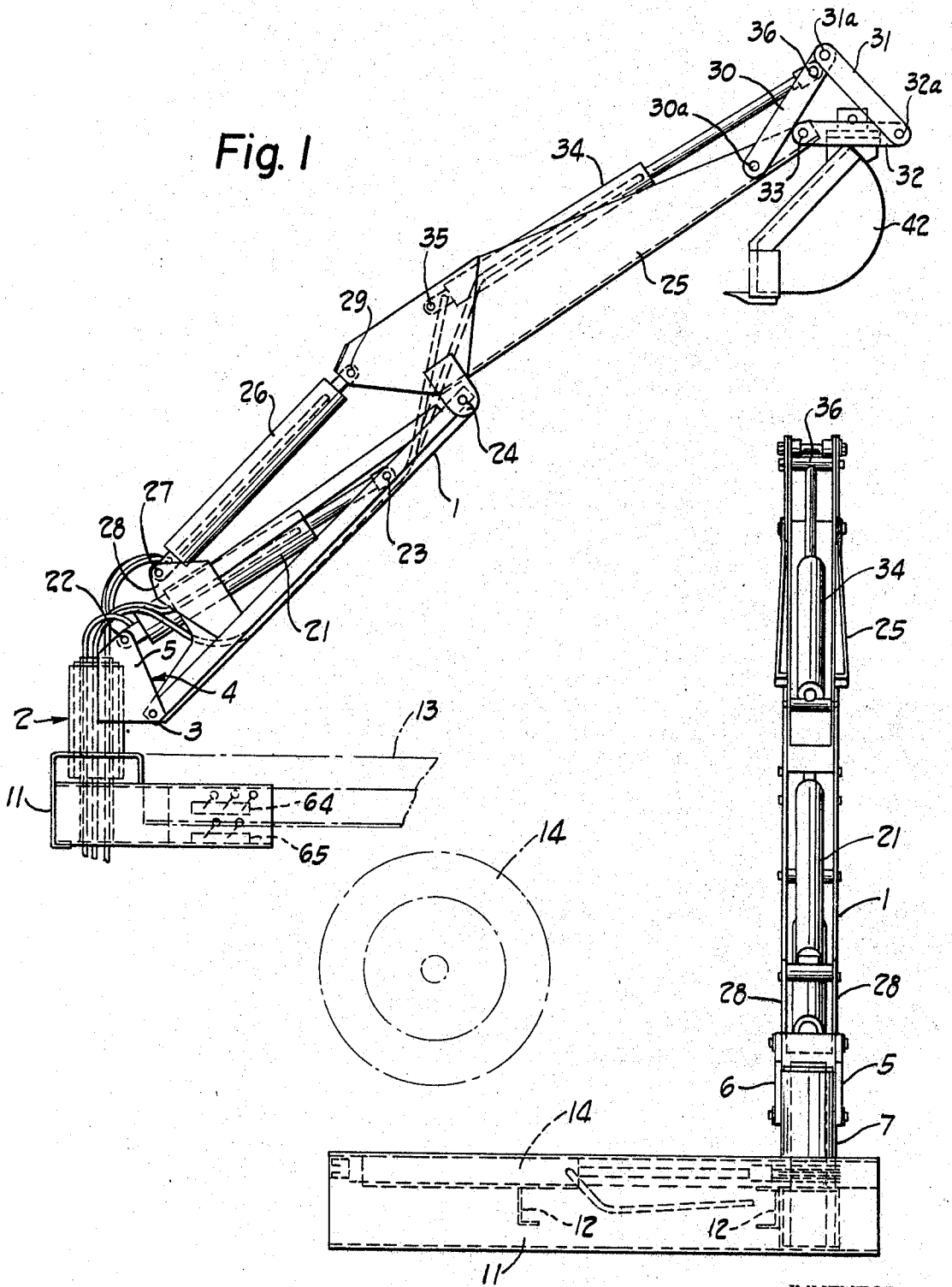

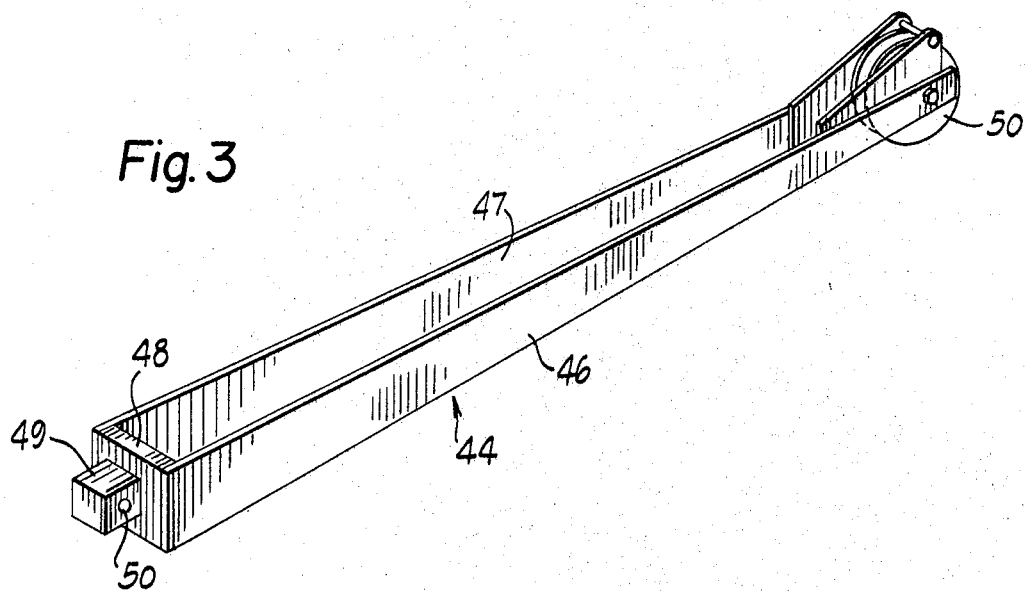
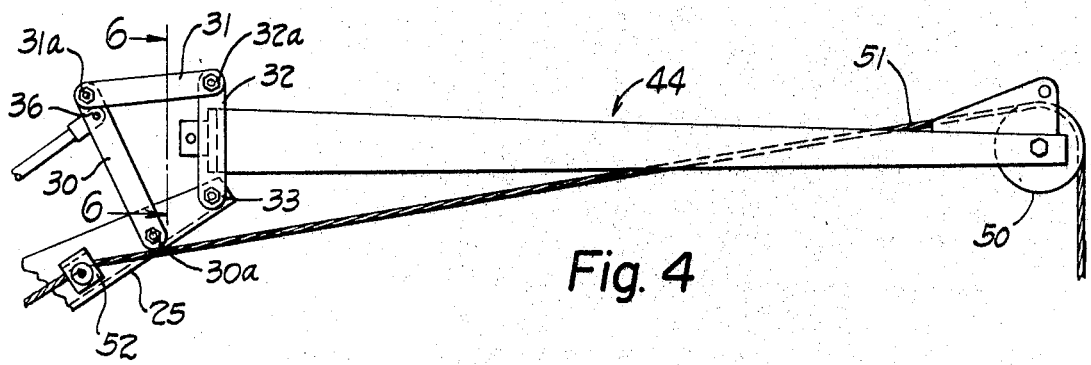
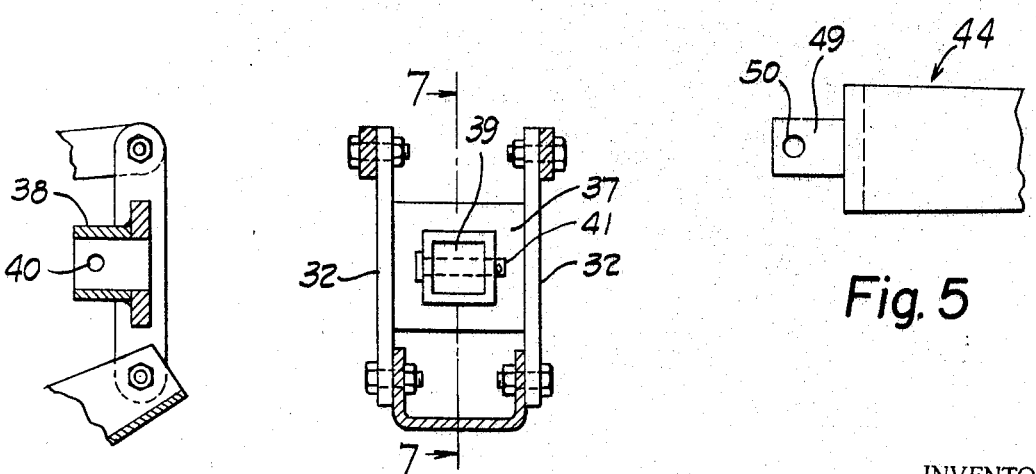

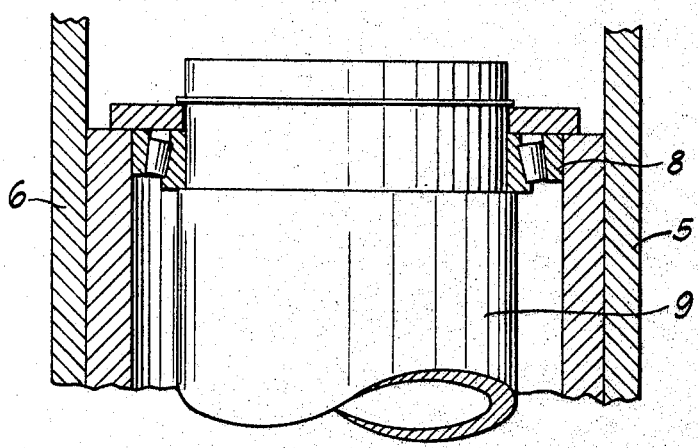
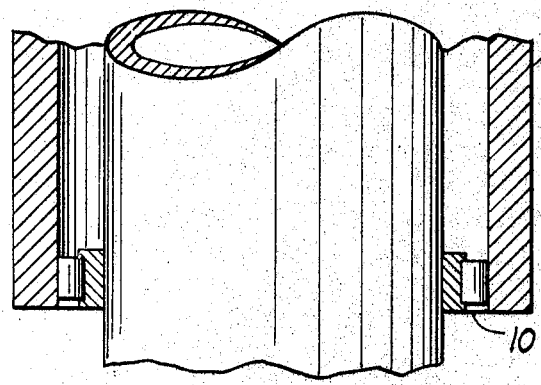
Fig. 8
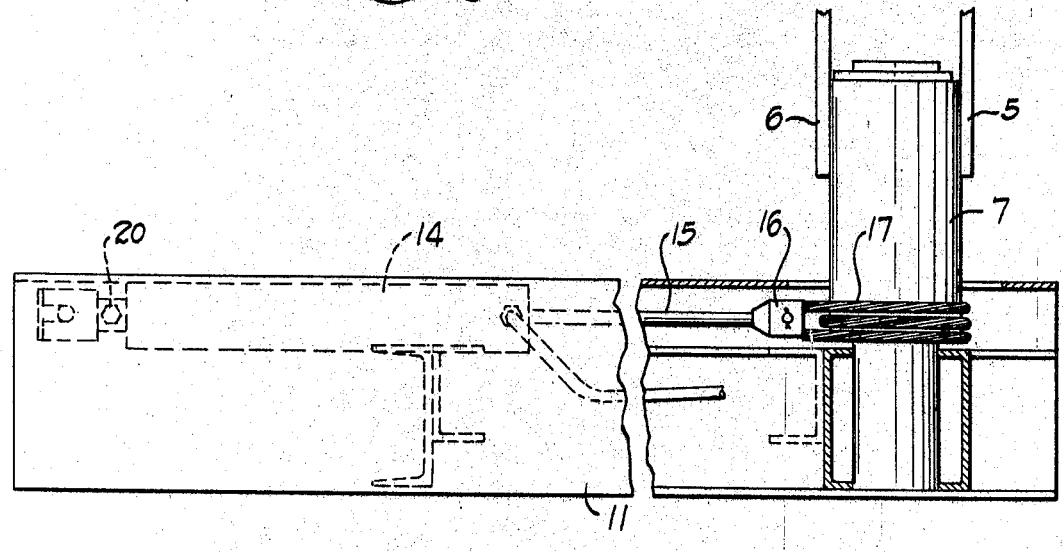
Fig. 9

United States Patent Office 3,524,560
Patented Aug. 18, 1970

3,524,560
ALL-PURPOSE BOOM CONSTRUCTION
Thomas R. Hall, 6500 SW. Seymour St.,
Portland, Oreg. 97225
Filed Jan. 10, 1968, Ser. No. 696,758
Int. Cl. B66f 9/00; E02f 3/30
U.S. Cl. 214—138          4 Claims

ABSTRACT OF THE DISCLOSURE

This invention discloses boom construction which is arranged to be mounted on and removed from a truck or the like, particularly a truck of the class known as pick-up trucks, with the primary concept of having the boom able to swing 360 degrees, be of articulated form, and arranged to interchangeably support a plurality of different types of work performing devices thereon, so that with a minimum amount of effort various devices may be emplaced on and removed from the boom to make the boom more versatile so that the range of operations which are susceptible of being carried out will vary from digging to cable handling or equally widely varying operations. The unique arrangement of the hydraulic instrumentalities availed of for operating the various parts of the mechanism, together with a linkage and mounting structure for the work performing devices, are further disclosures which render this construction useful and versatile.

---

A principal object of the invention is to provide a compact self-contained structure so to speak, which is capable of being used as any type of boom is used and under the varying conditions of mounting and positioning, actually carry out digging operations which are not normally thought of as being those performed by a boom or the like, in structures of the nature herein disclosed.

A particular object of the invention is to provide the rotating arrangement of the boom which will carry the same through 360 degrees, and permit the articulating action of the boom itself to be effective in all of the various positions through which the same may be rotated, whether the operation to be ultimately performed is digging, drilling a hole, or pavement breaking or similar unrelated operations.

A particular object of the invention is to arrange the respective boom parts and certain linkage provided thereon to facilitate the manipulation of the work performing devices, whether the same be of a digging bucket or a boom extension for setting poles or handling cable or the like.

A specific object of the invention is to provide certain linkage instrumentalities and mounting means provided therein, which will receive readily the various work performing devices and permit the removal and substitution therefor of other devices for unrelated and varying types of operations.

With the foregoing in mind, a complete explanation of the invention is set forth hereinafter in the specification and disclosed in the drawings wherein:

FIG. 1 is a fragmentary view partly, showing the boom as a whole supported on a vehicle and the primary relationship of the several parts of the boom structure itself.

FIG. 2 is a rear view of the structure shown in FIG. 1 showing additionally similar relationships.

FIG. 3 is a perspective view showing a boom extension section adapted to be engaged with the boom structure shown in FIG. 1.

FIG. 4 is a fragmentary view in side elevation, showing the boom extension section of FIG. 3 as it is mounted at the end of the boom structure disclosed in FIG. 1.

FIG. 5 is a fragmentary somewhat enlarged view showing a mounting end of the boom extension section of FIG. 3.

FIG. 6 is a view taken about on the line 6—6 looking in the direction of the arrows in FIG. 4 to illustrate the mounting arrangement of the boom extension section of FIG. 3.

FIG. 7 is a fragmentary sectional view taken about on the line 7—7 of FIG. 6, looking in the direction of the arrows.

FIG. 8 is an enlarged fragmentary view, partly in section, showing the arrangement for rotatively supporting a boom structure.

FIG. 9 is a fragmentary view, partly in section, showing the means for rotating the boom and part of the mounting therefor.

Figure 10:
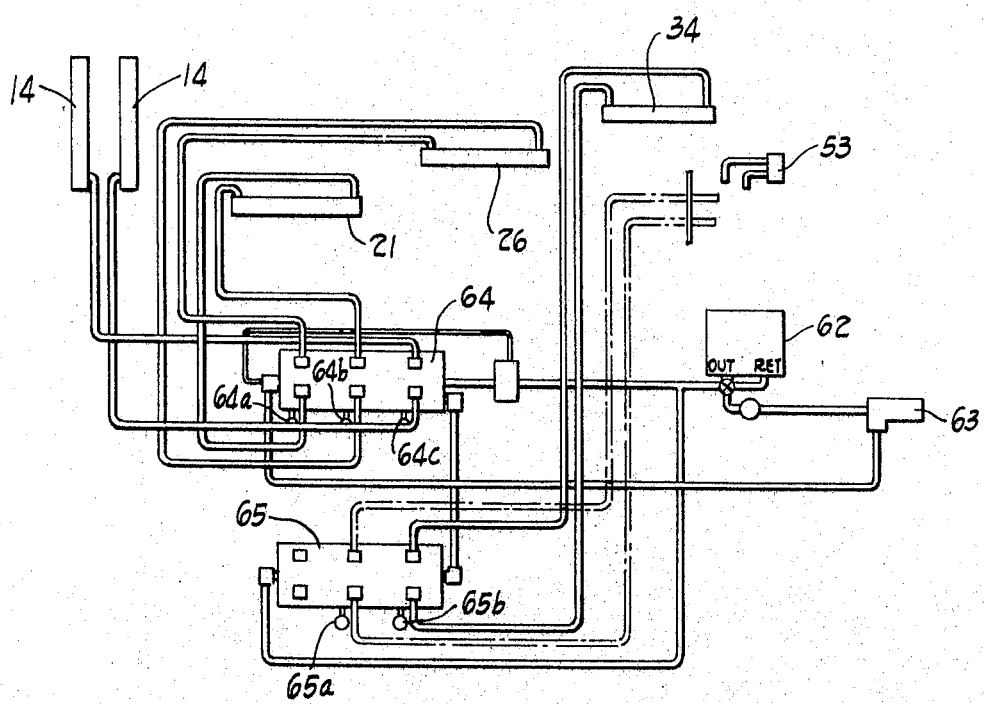
FIG. 10 is a schematic view showing the hydraulic layout of the machine.

Referring now to FIG. 1, there is disclosed a boom structure hereof, comprising a primary boom member 1 mounted on a pedestal 2 as by means of a pivot 3, which pivot 3 is at the lower extremity of a boom mounting unit 4 which consists of a pair of spaced generally triangular shaped parts 5 and 6, suitably secured at opposite sides of a boom mounting member 7 which comprises a cylindrical part as shown in greater detail in FIGS. 8 and 9, the part 7 having a thrust bearing 8 at its upper portion engaging a column 9, a needle bearing unit 10 being positioned at the lower end of the member 7.

The column 9 is rigidly engaged with a base 11, the latter being in turn connected to the frame parts 12 of a truck, suggested as to the body thereof at 13 as supported on rear wheels such as 14.

The base 11 extends across the rear of the truck frame parts 12 and as shown in FIG. 9 includes therewithin a hydraulic piston and cylinder unit such as 14, the piston rod 15 thereof being connected at its outer or free end as by means of a connection 16 with a cable 17 which is wrapped around the cylindrical member 9 and secured thereto intermediate its ends, the other ends of the cable 17 being connected to a similar piston rod and end arrangement as that of the piston and cylinder unit 14, the piston and cylinder unit of the latter lying behind the unit 14, and thus not distinguishable therefrom in the views, but nevertheless being identically mounted as by being pivotally connected at 20 to the base 11 previously referred to.

It will thus be understood that suitable operation of the piston and cylinder unit 14 and its counter part will effect a wrapping and unwrapping of the cable 17 around the member 7, and thus effectively rotate the member 7 and the boom structure 1 supported thereby.

The primary boom member 1 is adapted to be swingably moved with respect to the pedestal 2 as by means of an hydraulic piston and cylinder unit 21 which is connected at one end at 22 to the members 5 and 6 which are fastened to the mounting member 7 and at the other end the unit 21 is pivotally engaged at 23 with the boom member 1.

At the outer extremity of the boom member 1 on the pivot 24, a secondary boom member 25 is located for pivotal movement with respect to the member 1, under the control of an hydraulic piston and cylinder unit 26 in which one end of the unit 26 is connected at 27 to a pair of upstanding ears 28 on the boom member 1, and at the other end at 29 to the secondary boom member 25 at a position spaced from the pivotal connection 24, so that the swinging of the member 25 may be effected around the pivot 24.

At the outer extremity of the secondary boom member 25, there is provided a trapezoidal linkage arrangement which includes pairs of links 30, 31 and 32, the links 30 pivotally connected at 30a to the boom member 25 at one end, and to the links 31 at 31a at the other end.

The links 31 are in turn connected at 32a to the links 32, the latter in turn being pivotally connected at 33 to the secondary boom member 25 at a position spaced from the pivotal connections 30a.

The motion of the linkage here described is suggested when comparison of the FIG. 1 disclosure is made with that in FIG. 4, and to effect the positioning as indicated by the two views and other similar positions there is provided an hydraulic piston and cylinder unit 34 pivotally connected at 35 to the secondary boom member 25, and at 36 to the links 30 previously mentioned.

Referring now to FIGS. 6 and 7, the links 32 are shown as having extending therebetween a mounting member 37 which is suitably fastened at its ends to the respective links 32, and in turn provided with a socket 38 in which the opening is rectangular as indicated in FIG. 6, and denoted 39.

It will be understood that the socket 38 is suitably welded or otherwise secured to the part 37, and thus integral therewith for all intents and purposes, and includes therein the transversely aligned openings 40 to receive a pin such as 41.

Referring again to FIG. 1, the socket 38 is shown as having mounted therein a bucket denoted 42, which bucket may be located and positioned to be used as a back hoe type of bucket, the pin 41 retaining the bucket in position for operation and facilitating the removal of the bucket as conditions may dictate.

If the bucket is removed, and it is desired to substitute therefor a boom extension section such as illustrated in FIGS. 3 and 4, such a boom extension section denoted 44 may be supplied as illustrated in this case comprising spaced side plates 46 and 47, being equipped at one end with suitable mounting member 48 which includes the rectangular part 49 having an opening 50 therethrough, which part 49 is to be inserted in the socket 38 and secured therein by the pin such as 41 previously referred to.

The boom extension section 44 may have a sheave such as 50 at its outer end, and the sheave 50 may be useful for reeving a cable such as 51 thereover, the outer end of the boom member 25 being provided with a suitable cable guide 52 so that the cable from another source may be trained thereover or therethrough and thus over the sheave 50 previously mentioned.

Figures 11, 12:
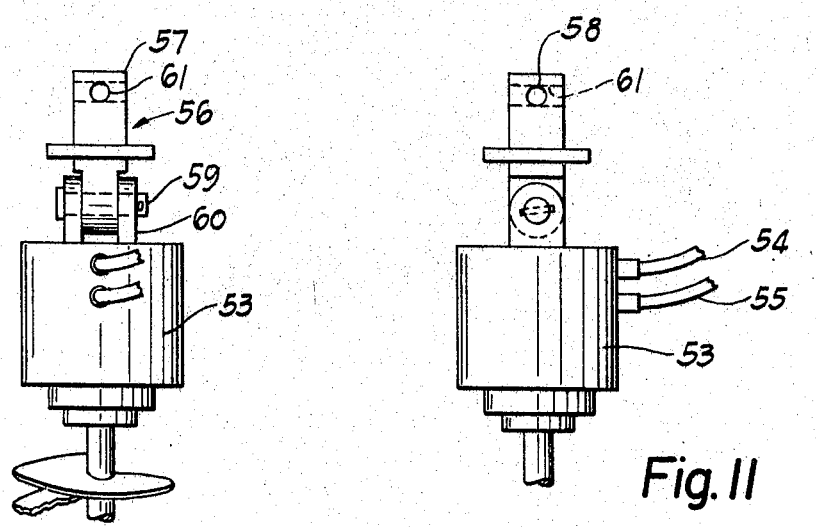
FIG. 11 is a fragmentary view, showing a device which may be substituted for the boom extension of FIG. 3.
FIG. 12 is a further view of the device of FIG. 11.

Under some other condition, it may be useful to substitute an auger driven by a motor such as 53 disclosed in FIGS. 11 and 12, which may be hydraulically driven as through the lines 54 and 55 extending therefrom, this motor being hydraulically operated as will be understood and including a connection denoted 56 which comprises a rectangular member 57 having the opening 58 therein, and a pivotal connection at 59 with suitable upstanding ears 60 so that the motor unit 53 may be swingable with respect to the member 56.

The member 57 of the part 56 may be inserted in the socket 38 previously mentioned, and connected thereto by a pin such as the pin 41 and thereafter suitable manipulation of the respective boom parts may cause the auger to be positioned as desired for a drilling operation in earth or the like.

Under some circumstances it may be desirable to have the auger motor 53 arranged so that it will drill horizontally at right angles to the boom and its respective parts, and to that end of course the same may be rotated 90 degrees, and by provision of a further opening 61 therein, inserted and pinned in the socket 38 by the pin 41. Thus, the swinging relationship of the motor 53 will be from side to side, rather than fore and aft and the auger may be laid down on the ground by manipulation of the boom and caused by the boom to move along the ground and thus drill horizontally therethrough to one side.

In order to effect the hydraulic control and actuation of the respective parts, the various hydraulic lines are illustrated in FIG. 10 as extending from a tank 62, pressurized by a pump 63, and through control valves 64 and 65, effect the various manipulation required through levers such as 64a which actuates the secondary boom by means of the hydraulic piston and cylinder unit 26 provided therefor, a lever 64b to actuate the hydraulic piston and cylinder unit 21 of the primary boom member 1, and a lever 64c which controls the rotation of the boom as effected by the hydraulic piston and cylinder units such as 14, illustrated in FIG. 9.

The other valve 65 is equipped with a lever 65a which may direct hydraulic fluid under pressure to the motor such as 53 previously referred to and a lever 65b which operates the hydraulic piston and cylinder unit 34 which in turn causes movement of the trapezoidal linkage instrumentalities including the links 30, 31 and 32.

From the foregoing it will be clear that a very versatile boom structure has been provided which makes possible the use of a number of different work performing devices to be carried thereby and manipulated throughout various positions, being readily attached to and detached from such boom structure with a minimum amount of difficulty whereby a boom structure such as disclosed here, will carry out a wide variety of operations and yet such boom structure may be mounted on a truck or demounted therefrom as circumstances dictate, complete rotation of the boom structure being possible as well as articulating action being carried out thereby.

I claim:

1. In boom construction of the class described, in combination, a base for transverse, demountable attachment in rear of a pick-up truck, a pedestal unit at one end of the base to provide clear access to the truck body from the rear thereof, said unit extending upwardly therefrom for rotatively supporting a boom structure, a boom structure connected to said pedestal unit for articulating movement with respect thereto, means in the base for rotating the boom structure 360 degrees, manipulating linkage instrumentalities at the outer end of the boom structure, said instrumentalities having means to interchangeably support various work performing devices thereon, and means spaced from such structure to actuate and control said boom structure, said linkage instrumentalities including a substantially rectangular fixed female socket member to removably, drivably engage a bucket having a mating member seated in the socket member to prevent relative rotation between the respective members, said bucket being manipulable with said boom structure to effect digging and dumping operation of the bucket.

2. Boom construction as claimed in claim 1, wherein the linkage instrumentalities include a substantially rectangular fixed female socket member to removably support a boom extension section, said section having a mating member seated in the socket member, to prevent relative rotation between the respective members.

3. Boom construction as claimed in claim 1, wherein the linkage instrumentalities include a substantially rectangular fixed female socket member to removably support a work performing device for operation in the plane of the boom and at right angles thereto, said device having a mating member seated in the socket member to prevent relative rotation between the respective members.

4. Boom construction as claimed in claim 1, wherein the linkage instrumentalities at the outer end of the boom structure include a trapezoidal linkage arrangement, and the means to interchangeably support various work performing devices thereon comprise a socket member which is in turn one of the links in the trapezoidally arranged linkage parts referred to.

References Cited

UNITED STATES PATENTS

| | | | |
|---|---|---|---|
| 2,852,149 | 9/1958 | Bruneri et al. | 214—138 |
| 3,319,813 | 5/1967 | Beyea | 214—138 X |
| 2,768,499 | 10/1956 | Pilch | 214—138 X |
| 3,033,394 | 5/1962 | Kashergen | 214—138 |
| 3,333,717 | 8/1967 | Scaperotto | 214—138 |
| 2,903,142 | 9/1959 | Wills | 212—66 |

HUGO O. SCHULZ, Primary Examiner

U.S. Cl. X.R.

212—8, 66; 214—130, 145